United States Patent [19]
Erkkila et al.

[11] Patent Number: 5,712,345
[45] Date of Patent: Jan. 27, 1998

[54] BINDER SYSTEM FOR MAGNETIC MEDIA

[75] Inventors: Ruth M. Erkkila, Lilydale; James G. Carlson, Lake Elmo, both of Minn.; Christopher M. Evans, Essex, United Kingdom; James A. Greczyna, Vadnais Heights; Ramesh C. Kumar, Maplewood, both of Minn.; Colin F. Norman, Essex, United Kingdom; Nelson T. Rotto, North St. Paul, Minn.

[73] Assignee: Minnesota Mining and Manufacturing Company, St. Paul, Minn.

[21] Appl. No.: 748,069

[22] Filed: Nov. 12, 1996

Related U.S. Application Data

[60] Continuation of Ser. No. 457,568, Jun. 1, 1995, abandoned, which is a division of Ser. No. 282,958, Jul. 29, 1994, Pat. No. 5,501,903.

[51] Int. Cl.$^6$ .............................. C08L 33/18; C08L 75/12
[52] U.S. Cl. ........................... 525/131; 525/127; 525/502
[58] Field of Search ................................. 525/127, 131; 524/507

[56] References Cited

U.S. PATENT DOCUMENTS

| | | | |
|---|---|---|---|
| 3,149,996 | 9/1964 | Wagner et al. | 117/72 |
| 3,976,626 | 8/1976 | Turck | 526/78 |
| 4,244,987 | 1/1981 | Aydin et al. | 427/130 |
| 4,529,661 | 7/1985 | Ninomiya et al. | 428/425.9 |
| 4,612,244 | 9/1986 | Kaneda et al. | 428/323 |
| 4,770,941 | 9/1988 | Imai et al. | 428/411.1 |
| 4,783,370 | 11/1988 | Chernega et al. | 428/425.9 |
| 4,784,913 | 11/1988 | Nakamura et al. | 428/411.1 |
| 4,784,914 | 11/1988 | Matsufuji et al. | 428/418 |
| 4,830,923 | 5/1989 | Sumiya et al. | 428/425.9 |
| 4,837,082 | 6/1989 | Harrell et al. | 428/329 |
| 4,842,942 | 6/1989 | Yatsuka et al. | 428/425.9 |
| 4,851,465 | 7/1989 | Yamakawa et al. | 524/431 |
| 4,861,683 | 8/1989 | Nakachi et al. | 428/694 |
| 4,876,148 | 10/1989 | Ramharack | 428/425.9 |
| 5,008,357 | 4/1991 | Nakachi et al. | 526/292.2 |
| 5,024,892 | 6/1991 | Watanabe et al. | 428/423.1 |
| 5,028,676 | 7/1991 | Nakachi et al. | 526/277 |
| 5,037,934 | 8/1991 | Yasuda et al. | 527/72 |
| 5,064,730 | 11/1991 | Takano et al. | 428/694 |
| 5,081,213 | 1/1992 | Carlson | 528/73 |
| 5,096,774 | 3/1992 | Sano et al. | 428/323 |
| 5,098,783 | 3/1992 | Watanabe et al. | 428/323 |
| 5,124,424 | 6/1992 | Endo et al. | 528/48 |
| 5,126,202 | 6/1992 | Inaba et al. | 428/402 |
| 5,139,892 | 8/1992 | Nakachi et al. | 428/694 |
| 5,151,330 | 9/1992 | Kumamoto et al. | 428/425.9 |
| 5,153,053 | 10/1992 | Hashimoto et al. | 428/215 |
| 5,165,999 | 11/1992 | Ushimaru et al. | 428/425.9 |
| 5,242,752 | 9/1993 | Isobe et al. | 428/329 |
| 5,320,914 | 6/1994 | Nakamura et al. | 428/694 |
| 5,510,187 | 4/1996 | Kumar et al. | 428/425.9 |

FOREIGN PATENT DOCUMENTS

| | | |
|---|---|---|
| 3639250 | 5/1987 | Germany . |
| 54-46518 | 4/1979 | Japan . |
| 54-46519 | 4/1979 | Japan . |
| 54-84708 | 5/1979 | Japan . |
| 55-15278 | 2/1980 | Japan . |
| 55-15279 | 2/1980 | Japan . |
| 55-15281 | 2/1980 | Japan . |
| 57-141020 | 2/1981 | Japan . |
| 59-219304 | 12/1984 | Japan . |
| 61-059623 | 3/1986 | Japan . |
| 61-26132 | 6/1986 | Japan . |
| 62-30162 | 2/1987 | Japan . |
| 01073523 | 3/1989 | Japan . |
| 01106324 | 4/1989 | Japan . |
| 02012613 | 1/1990 | Japan . |
| 02053219 | 2/1990 | Japan . |
| 02129217 | 5/1990 | Japan . |
| 03041618 | 2/1991 | Japan . |
| 0311018 | 6/1991 | Japan . |
| 03203020 | 9/1991 | Japan . |
| 03224128 | 10/1991 | Japan . |
| 03224129 | 10/1991 | Japan . |
| 03224130 | 10/1991 | Japan . |
| 1 574 721 | 9/1980 | United Kingdom . |

OTHER PUBLICATIONS

Polymer Prep. (ACS Div. Polym. Chem) 24(2), 126–95 (1983).

Brochure, CPS Chemical Company, Inc., Amine and Quaternary Monomers.

Brochure, Sekisui Chemical Co., Ltd., Chemical Specialty, Polyvinyl Acetal Resins, etc. (Jul. 1992).

F. Rodriguez, "Principles of Polymer Systems," Chemical Engineering Series, 2nd Edition (McGraw–Hill) pp. 181–185.

Allock and Lampe, "Contemporary Polymer Chemistry," pp. 436–437 (1981).

Wunderlich and Guar, "Differential Scanning Calorimetry of Flexible, Linear Macromolecules," Polymer Characterization: Spectroscopic, Chromatographic and Physical Instrument Methods, pp. 195–199 (1983).

*Primary Examiner*—Patricia A. Short
*Attorney, Agent, or Firm*—David B. Kagan; Susan Moeller Zerull

[57] ABSTRACT

A polymeric binder system useful for a magnetic recording medium, the polymeric binder system and comprising a hard resin component comprising a nonhalogenated vinyl copolymer and a soft resin component comprising a polyurethane having a phosphonate diester group. The binder system is useful for preparing the magnetic layer and/or backside coating of magnetic recording media, in order to provide media that demonstrate an improved combination of such as modulus, Tg, and smoothness.

24 Claims, No Drawings

BINDER SYSTEM FOR MAGNETIC MEDIA

This is a continuation of application Ser. No. 08/457,568 filed Jun. 1, 1995, now abandoned, which is a division of application Ser. No. 08/282,958 filed Jul. 29, 1994 now U.S. Pat. No. 5,501,903.

FIELD OF THE INVENTION

In one aspect, the present invention relates to magnetic recording media, and more particularly to magnetic recording media having magnetic and/or backside surfaces that support coatings prepared of binder systems for particles such as magnetic and nonmagnetic pigments.

BACKGROUND OF THE INVENTION

Magnetic recording media generally comprise a magnetic layer coated onto at least one side of a nonmagnetizable substrate. For particulate magnetic recording media, the magnetic layer comprises a magnetic pigment dispersed in a polymeric binder. The magnetic layer may also include other components such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

Some forms of magnetic recording media, such as magnetic recording tape, may also have a backside coating applied to the other side of the nonmagnetizable substrate in order to improve the durability, conductivity, and tracking characteristics of the media. The backside coating also includes a polymeric binder and other components such as nonmagnetic pigments (e.g., carbon black), lubricants, abrasives, thermal stabilizers, catalysts, crosslinkers, antioxidants, dispersants, wetting agents, fungicides, bactericides, surfactants, antistatic agents, coating aids, and the like.

The polymeric binders of the magnetic layer and the backside coating are commonly derived from polymers which require curing in order to provide the magnetic recording media with appropriate physical and electromagnetic properties. To prepare such media, the components of the magnetic layer or the backside coating, as appropriate, are combined with a suitable solvent and thoroughly mixed to form a homogeneous dispersion. The resulting dispersion is then coated onto the nonmagnetizable substrate, after which the layer or coating is dried, calendered if desired, and then cured.

The polymeric binders of magnetic recording media are most commonly polymer blends comprising a hard component, i.e., a polymer with relatively high glass transition temperature and modulus, and a soft component, i.e. a polymer with relatively low glass transition temperature and modulus. In the past, polyurethane polymers have been widely used as the soft component.

Hard Resin Component.

Copolymers based on vinyl chloride or vinylidene chloride have been widely used as the hard component of choice for use with polyurethanes, due to their miscibility and compatibility with polyurethanes and their relatively high glass transition temperatures, moduli, and hardness. For example, Japanese Publication No. JP61-26132 describes the use of vinyl chloride/vinyl acetate/vinyl alcohol copolymers as a polymeric binder component in magnetic recording media.

Magnetic pigments tend to agglomerate and can be difficult to initially disperse in the polymeric binder, or to keep dispersed in the polymeric binder over time. Low molecular weight wetting agents, or dispersants, are often employed to facilitate such dispersion. For higher pigment loadings, i.e., the use of greater amounts by weight of magnetic pigment, greater amounts of wetting agent or dispersant may be required. This is not always desirable. Dispersants tend to plasticize binder systems and can decrease their modulus. Further, excess dispersant may exude from a cured binder system over time, leading to changes in the properties of the media as well as to contamination of a recording head or the like.

To help alleviate the problems associated with added low molecular weight dispersants or wetting agents, polymeric binders formed from "self-wetting" polymers have been developed. "Serf-wetting" polymers have dispersing groups pendant from the polymer backbone that help disperse the magnetic pigment. Representative examples of dispersing groups include quaternary ammonium, amine, heterocyclic moieties, salts or acids based on sulfate, salts or acids based on sulfonate, salts or acids based on phosphate, salts or acids based on phosphonate, and salts or acids based on carboxyl, as well as mixtures thereof.

As a result of using self-wetting polymers, less low molecular weight dispersant or wetting agent, or even no low molecular weight dispersant or wetting agent, may be needed to disperse the magnetic and nonmagnetic (if any) pigments in the polymeric binder. Self-wetting vinyl chloride copolymers have been described. See, e.g., U.S. Pat. Nos. 5,139,892; 5,126,202; 5,098,783; 5,064,730; 5,028, 676; 5,008,357; 4,861,683; 4,784,913; 4,770,941; and 4,244,987.

Vinyl chloride or vinylidene chloride copolymers, however, tend to degrade over time, releasing gaseous HCl which can change the properties of the media as well as corrode the recording head or the like. Accordingly, some investigators have described vinyl copolymers used in magnetic recording media, wherein the use of vinyl chloride and vinylidene chloride has been avoided. See, e.g., U.S. Pat. Nos. 5,098,783; 4,876,149; and 4,837,082; and Japanese Publication Nos. SHO 62-30162; SHO 54-84708; SHO 54-46519; and SHO 54-46518.

Soft Resin Component.

A few polyurethanes have been proposed that contain phosphorous-based wetting functionalities, referred to herein as "P functional" polyurethanes. Generally, no evidence is apparent to suggest that any one type is to be preferred. The phosphorus functionality can be either pendant to the main polymer chain or an integral part of it. There are surprisingly few examples of the use of a phosphonate functionality for such purposes. Phosphorous-based functionalities are often preferred in conventional, low molecular weight dispersants. Examples of patents which disclose the use of phosphorus chemistry in self-wetting polyurethanes include JP 01-106324A, JP 02-053219A, U.S. Pat. No. 4,612,244 and U.S. Pat. No. 4,842,942.

Several patents disclose polyurethanes with both phosphorous-based and hydroxy functionalities at sites other than at chain ends. For example, JP 02-012613A describes P functional polyurethanes with tertiary hydroxy functionality at positions other than chain ends.

It appears unlikely, however, that a coating containing only polyurethane would provide all of the essential physical properties required. Thus, binders in magnetic media generally comprise both a soft resin and a hard resin. For example, JP 01-073523A and U.S. Pat. No. 4,837,082 discuss the need to find the correct balance of soft and hard resin components within the cross-linked binder matrix in order to maintain flexibility whilst ensuring that the matrix has the required tensile strength and modulus. The presence of a hard resin having a higher glass transition temperature ("Tg"), compared to the low Tg urethane, also provides for improved thermal stability.

JP 02-129217A, which discloses phosphorus-containing urethanes, contains no reference to the inclusion of hard resin binders, for example vinyl chloride or nitrocellulose materials. Other references that claim good dispersivity from the sole use of a self-wetting resin based on phosphorus-containing acid wetting groups can be found in U.S. Pat. No. 5,037,934.

There are several disclosures of the use of binder blends containing self-wetting polymers. These can be divided into three groups; (a) self-wetting polyurethanes with "non-wetting" hard resins, (b) "non-wetting" polyurethanes with self-wetting hard resins and (c) the use of urethanes and hard resins which both contain polar wetting functionalities.

Examples from group (a) combine self-wetting urethanes, which disclose the inclusion of phosphorus functionality, with commercially available vinyl chloride based resins. JP 02-012613, for instance, discloses examples of self-wetting urethanes blended with vinyl chloride/vinyl acetate, vinyl chloride/vinyl propionate, thermoplastic polyurethanes, cellulose polymers, thermoplastic polyesters, epoxy resins, and phenolic resins. Other examples which use these blended binder materials can be found in JP 3224130A, JP 3224129A, JP 3224128A and U.S. Pat. No. 4,529,661.

With respect to group (b), U.S. Pat. No. 5,151,330 (corresponding to JP 3219417) describes the use of a binder blend that includes a polyurethane resin containing polycaprolactone units and a self-wetting vinyl chloride resin containing various polar groups including phosphonic and phosphoric acids and salts. Similar examples are described in JP 3041618 and U.S. Pat. No. 5,096,774.

With regard to group (c), several patents describe binder blends in which both materials (urethane and hard resin) contain polar groups for pigment dispersing. However, the choice of such polar groups is generally limited to acids and salts comprising either sulphur or phosphorus. For example, JP 3203020 teaches the use of two different resin types, vinyl chloride or cellulose derivative or polyester resin with a polyurethane or polyester resin, each containing a polar group from, $SO_3M$, $COOM$ or $PO(OM)_2$, where M=H, alkali metal, or ammonium. Other patents which disclose such wetting functionalities include JP 3141018, U.S. Pat. No. 4,830,923 and U.S. Pat. No. 4,784,914.

At present then, most commercially available magnetic media is made using a binder system which includes a blend of a polyurethane resin and a vinyl chloride-containing copolymer. Because of the potential of degradation caused by dehydrochlorination of the vinyl chloride hard resin, it remains highly desirable to eliminate vinyl chloride from magnetic media.

While binder systems based on the omission of vinyl chloride and the inclusion of wetting groups have provided some improvement, it is generally recognized that even further improvement in certain respects would be highly desirable. For instance, it would be particularly desirable to have a binder system that provides further improvement in a variety of performance characteristics, particularly including modulus, Tg, and smoothness.

SUMMARY OF THE INVENTION

We have now developed a polymeric binder system useful for the magnetic layer, backside coating, or both, of a magnetic recording medium, the polymeric binder system comprising:

(a) a hard resin component comprising a nonhalogenated vinyl copolymer comprising a plurality of pendant nitrile groups, a plurality of pendant hydroxyl groups, and at least one pendant dispersing group, and (b) a soft resin component comprising a polyurethane polymer comprising at least one pendant dispersing group comprising a phosphonate diester group.

The binder system of the present invention provides magnetic layers and backside coatings for magnetic media that demonstrate improved performance in such properties as modulus, Tg, and smoothness.

In a preferred embodiment, the system of the present invention comprises:

(a) as the hard resin component, a nonhalogenated vinyl copolymer wherein the vinyl copolymer is a copolymer of monomers comprising:

(i) 5 to 40 parts by weight of (meth)acrylonitrile;

(ii) 30 to 80 parts by weight of a nonhalogenated, nondispersing, vinyl monomer;

(iii) 5 to 30 parts by weight of a nonhalogenated, hydroxyl functional, vinyl monomer; and (iv) 0.25 to 10 parts by weight of a nonhalogenated, vinyl monomer bearing a dispersing group, and (b) as the soft resin component, a phosphonated polyurethane having a plurality of units of the formula:

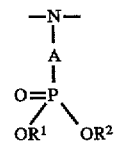

in which:

the nitrogen atom forms part of the backbone chain of the polymer, A represents a single bond or divalent linking group, and $R^1$ and $R^2$ independently represent an alkyl group, cycloalkyl group, aryl group or together comprise the necessary carbon atoms to complete a ring.

The invention also provides a composition comprising a binder system of a type described above having magnetic and/or nonmagnetic pigment dispersed therein. In another aspect, the invention provides magnetic recording media comprising a substrate bearing a layer or coating of such a composition.

It has been found that the compositions of the invention provide good quality coatings. When used to form magnetic layers, the present compositions exhibit good low shear viscosity properties, good stability properties and improved bulk magnetic properties and durability. The compositions also provide magnetic recording media that exhibit comparable or improved all around performance, particularly in terms of shear viscosity, smoothness, durability, and thermal stability, including Tg and modulus. The advantages that are provided when the present composition is used to prepare a magnetic layer have also been found when the composition is used to prepare magnetic tape backside coatings.

The magnetic recording medium comprises a magnetic layer provided on one major surface of a substrate. Optionally, a backside coating is provided on the other major surface of the substrate. In one preferred embodiment, the magnetic layer comprises a magnetic pigment dispersed in a polymeric binder of the present invention. In another preferred embodiment, the backside coating comprises a nonmagnetic pigment dispersed in such a polymeric binder. In another embodiment, both the magnetic layer and backside coating comprise such a polymeric binder.

In a particularly preferred embodiment, the invention provides a binder system for barium ferrite-containing magnetic media to provide a magnetic layer that provides improved Tg and elastic modulus. Barium ferrite-containing magnetic layers of the present invention having improved Tg and modulus are particularly desirable as they can result in significant improvements in the durability and operating characteristics of the resultant media.

The following commonly assigned co-pending applications, namely, U.S. application having Ser. No. 08/054,312 (filed Apr. 27, 1993), now abandoned, and British Patent Application No. 9320711.6, (filed Oct. 7, 1993) describe, individually, hard resin components and soft resin components useful in preparing a polymeric binder system of the present invention. In particular, U.S. Ser. No. 08/054,312, now abandoned, describes a magnetic recording medium comprising a nonhalogenated vinyl copolymer component and a secondary polymer component. The secondary component can be in the form of a polyurethane polymer comprising a pendant dispersing group selected from a number of different groups, including the group that includes a salt or acid based on phosphonate.

British Patent Application No. 9320711.6, in turn, describes a class of self-wetting polyurethanes, hereinafter referred to as "P-HPU" polyurethanes, in which the polyurethane has pendant moieties of the formula:

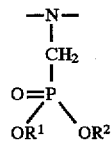

in which:

the nitrogen atom forms part of the backbone chain of the polymer, and $R^1$ and $R^2$ independently represent an alkyl group, cycloalkyl group, an aryl group or together comprise the necessary carbon atoms to complete a ring.

The British application describes such a polyurethane in combination with a vinyl chloride-based, self-wetting resin. The British application exemplifies, for instance, a combination of P-HPU polyurethane and a self-wetting vinyl chloride-based resin bearing pendant quaternary ammonium salt groups. The combination of P-HPU polyurethane with the vinyl chloride polymer provides excellent dispersion chemistry for magnetic pigments; in particular barium ferrite (BaFe).

Applicants have discovered that the combination of non-halogenated vinyl copolymers, as described in Ser. No. 08/054,312, with self-wetting P-HPU polyurethanes, as described in the British application, provides even greater improvement in a number of properties desirable in magnetic recording media.

DESCRIPTION OF THE PREFERRED EMBODIMENTS

As used throughout this specification, the term "nonhalogenated", as used with respect to a polymeric material, means that the polymeric material contains no covalently bound halogen atoms. Thus, the term "nonhalogenated" excludes vinyl halide monomers such as vinyl chloride or vinylidene chloride as monomeric components of the copolymer, but the term "nonhalogenated" does not exclude monomeric components such as (meth) acryloyloxyethyl trimethylammonium chloride in which chlorine is present as a chloride anion.

The term "vinyl" with respect to a polymeric material means that the material comprises repeating units derived from vinyl monomers. As used with respect to a vinyl monomer, the term "vinyl" means that the monomer contains a moiety having a free-radically polymerizable carbon-carbon double bond. Monomers having such moieties are capable of copolymerization with each other via the carbon-carbon double bonds.

The term "glass transition temperature", or "Tg", refers to the temperature at which the polymer or material changes from a hard, glassy material to a rubbery, or viscous, material. In the practice of the present invention values for Tg are determined by differential scanning calorimetry, as described in greater detail below.

Throughout this specification, the prefix "(meth)acryl-" means "methacryl-" or "acryl-". Although used interchangeably, the words "layer" and "coating", when used as the noun, will generally be used to refer to a coated composition on the magnetic and backside surfaces, respectively, of a substrate.

Magnetic recording media of the present invention comprise a magnetic layer provided on a nonmagnetizable substrate. When the media is in the form of a tape, a backside coating is optionally provided on the opposite side of the substrate. The particular nonmagnetizable substrate of the present invention can be formed from any suitable substrate material known in the art. Examples of suitable substrate materials include, for example, polymers such as polyethylene terephthalate ("PET"), polyimide, and polyethylene naphthenate ("PEN"); metals such as aluminum, or copper; paper; or any other suitable material.

The components of a magnetic layer comprise a magnetic pigment dispersed in a polymeric binder. Typically, the magnetic layer can contain 100 parts by weight of the magnetic pigment and 5 to 40 parts by weight of the polymeric binder. The type of magnetic pigment used in the present invention can include any suitable magnetic pigment known in the art including $\gamma$-$Fe_2O_3$, cobalt-doped $\gamma$-$Fe_2O_3$, $Fe_3O_4$, $CrO_2$, barium ferrite, barium ferrite derivatives, metal particles, and the like.

In addition to the nonhalogenated vinyl copolymer, the soft resin component, and the magnetic pigment, the magnetic layer of the present invention can also comprise one or more conventional additives such as lubricants; abrasives; crosslinking agents; head cleaning agents; thermal stabilizers; antioxidants; dispersants; wetting agents; antistatic agents; fungicides; bactericides; surfactants; coating aids; nonmagnetic pigments; and the like in accordance with practices known in the art.

Backside coatings for magnetic recording media can be prepared by the incorporation of nonmagnetic pigment dispersed in the polymeric binder system of the present invention. The backside coating can be prepared by coating an uncured polymeric binder system as described herein, onto a nonmagnetic substrate. The system is then dried and cured using techniques within the skill of those in the art, to provide a tough, durable backside coating.

Nonmagnetic pigments useful for the preparation of backside coatings include, for example, carbon black, $Al_2O_3$, $TiO_2$, and the like. The amount of pigment can vary, but is preferably within the range from about 30 to 55 parts by weight and most preferably within the range from about 40 to 50 parts by weight, based on 100 parts (dried weight) backside coating.

In addition to the nonhalogenated vinyl copolymer, the soft resin component, and the nonmagnetic pigment, the backside coating of the present invention may also comprise one or more conventional additives such as lubricants; abrasives; crosslinking agents; head cleaning agents; thermal stabilizers; antioxidants; dispersants; wetting agents; antistatic agents; fungicides; bactericides; surfactants; coating aids; and the like in accordance with practices known in the art.

The polymeric binder of the magnetic layer, the backside coating, or both comprises a polymeric binder comprising a hard resin component and a soft resin component as described herein. The hard resin component of the present invention includes a nonhalogenated vinyl copolymer having a plurality of pendant nitrile groups, a plurality of pendant hydroxyl groups, and at least one pendant dispersing group. It appears that the nitrile group may promote the compatibility of these vinyl copolymers with phosponated polyurethanes of the type described herein.

In order to provide a vinyl copolymer having pendant nitrile groups, one or more nitrile functional, nonhalogenated vinyl monomers can be incorporated into the vinyl copolymer. Representative examples of such monomers include (meth)acrylonitrile, β-cyanoethyl-(meth)acrylate, 2-cyanoethoxyethyl (meth)acrylate, p-cyanostyrene, p-(cyanomethyl)styrene, and the like. Preferably, the nitrile functional, nonhalogenated vinyl monomer is (meth) acrylonitrile, and more preferably acrylonitrile.

The pendant hydroxyl groups of the vinyl copolymer not only facilitate dispersion and interaction of the pigment in the polymeric binder, but also promote solubility, cure, and compatibility with other polymers. The hydroxyl groups can be primary, secondary, or tertiary, although primary and secondary hydroxyl groups are preferred. Generally, preferred vinyl copolymers of the present invention have a hydroxyl equivalent weight in the range from about 300 to about 10,000, preferably 500 to 5000, more preferably 800 to 1500.

In order to provide a vinyl copolymer having a plurality of pendant hydroxyl groups, one or more nonhalogenated, hydroxyl functional, vinyl monomers can be incorporated into the vinyl copolymer. Representative examples of suitable nonhalogenated, hydroxyl functional, vinyl monomers include an ester of an α,β-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene; or the like.

Preferably, the nonhalogenated, hydroxyl functional, vinyl monomer is selected from 2-hydroxyethyl (meth) acrylate, 2-hydroxypropyl (meth)acrylate, and mixtures thereof. Alternatively, vinyl copolymers with pendant hydroxyl groups can also be prepared by incorporating vinyl acetate into the vinyl copolymer and then partially or fully hydrolyzing the acetate moieties to produce hydroxyl groups.

The dispersing group of the vinyl copolymer facilitates dispersion of pigment in the polymeric binder. In those instances wherein the vinyl copolymer includes more than one dispersing group, the dispersing groups can be the same, or they can be different. It is desirable that the vinyl copolymer have a dispersing group equivalent weight in the range from about 2000 to about 100,000, preferably about 5000 to about 50,000.

As used throughout this specification, the term "dispersing group" means that a group is capable of wetting the magnetic and/or nonmagnetic pigment particles incorporated into a dispersion containing the binder. Preferably, the term "dispersing group" refers to a group that is ionized or ionizable at a pH in the range from 2 to 10. Representative examples of suitable dispersing groups include quaternary ammonium moieties (e.g., $-N(CH_3)_3^+Cl^-$ as one example), amines (e.g., $-N(CH_3)_2$ as one example), heterocyclic moieties as described in U.S. Pat. No. 5,081,213, sulfobetaines (e.g., $-N^+(CH_3)_2(CH_2CH_2CH_2SO_3^-)$), salts or acids based on sulfate (e.g., $-OSO_3Na$ as one example), salts or acids based on sulfonate (e.g., $-SO_3Na$ as one example), salts or acids based on phosphate (e.g., $-OPO(OH)_2$ as one example), salts or acids based on phosphonate (e.g., $-PO(OH)_2$ as one example), salts or acids based on carboxyl (e.g., $-COONa$ as one example), mixtures thereof, and the like.

One or more dispersing groups can be introduced into the vinyl copolymer in a variety of ways. As one approach, dispersing initiators can be used. Dispersing initiators initiate copolymerization of vinyl monomers to provide vinyl copolymers with terminal dispersing groups. Examples of suitable dispersing initiators include 4,4'-azobis (cyanovaleric acid), succinic acid peroxide, potassium persulfate, and sodium perphosphate. Another approach for introducing the dispersing group into the vinyl copolymer is to use a functional chain transfer agent such as mercaptosuccinic acid during copolymerization of the vinyl monomers.

The dispersing group can also be introduced into the vinyl copolymer through the use of a nonhalogenated, vinyl monomer bearing a dispersing group. Representative examples of suitable nonhalogenated, vinyl monomers bearing a dispersing group include (meth)acryloyloxyethyl trimethyl ammonium chloride, (meth)acryloyloxyethyl acid phosphate, (meth)acrylamidopropyl trimethylammonium chloride, (meth)acryloyloxypropyl dimethylbenzylammonium chloride, vinylbenzyl trimethylammonium chloride, 2-hydroxy-3-allyloxypropyl trimethylammonium chloride, (meth)acrylamidopropyl sodium sulfonate; sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, dimethylaminoethyl (meth)acrylate, maleic anhydride, N-(3-sulfopropyl)-N-(meth)acryloyloxyethyl-N,N-dimethylammonium betaine, 2-[(meth)acryloyloxy]ethyl trimethylammonium methosulfate, N-(3-sulfopropyl)-N-(meth)acrylamidopropyl-N,N-dimethylammonium betaine, vinylbenzyl trimethylammonium chloride, mixtures thereof, and the like.

A dispersing group can also be introduced into the vinyl copolymer using suitable polymer reactions. Examples of suitable polymer reactions to provide the dispersing group include: (1) reaction of succinic anhydride with a portion of the hydroxyl groups on a vinyl copolymer to produce a vinyl copolymer with pendant acid functionality; and (2) reaction of a tertiary amine with the epoxy groups on a vinyl copolymer to produce a vinyl copolymer with pendant quaternary ammonium groups. In order to provide a vinyl copolymer having a pendant epoxy groups for this reaction, nonhalogenated, epoxy functional vinyl monomers can be incorporated into the vinyl copolymer. Such monomers include, for example, glycidyl ether of an unsaturated alcohol such as allyl glycidyl ether, a glycidyl ester such as glycidyl (meth)acrylate, and the like.

Preferred vinyl copolymers of the present invention are copolymers of monomers comprising (meth)acrylonitrile; a nonhalogenated, hydroxyl functional, vinyl monomer as described above; a nonhalogenated, vinyl monomer bearing a dispersing group as described above; and one or more nonhalogenated, nondispersing, vinyl monomers. The term "nondispersing" means that the monomer bears no dispersing group and no hydroxyl group.

Representative examples of suitable copolymerizable, nonhalogenated, nondispersing, vinyl monomers include styrene; alkylated styrenes; alkoxy styrenes; vinyl naphthalene; alkylated vinyl naphthalenes; alkoxy vinyl naphthalenes; (meth)acrylamides; N-vinyl pyrolidone; linear, branched, or alicyclic alkyl esters of (meth)acrylic acid wherein the alkyl groups contain from 1 to 20, preferably 1–8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and can be linear, branched, or alicyclic; isobornyl (meth)acrylate; glycidyl (meth)acrylate vinyl acetate; allyl (meth)acrylate, and the like. Preferred nonhalogenated, nondispersing, vinyl monomers include styrene, alkyl-substituted styrenes, alkyl (meth)acrylates wherein the alkyl group contains 1 to 4 carbon atoms, and mixtures thereof. Most preferably, the nonhalogenated, nondispersing, vinyl monomer is selected from styrene, methyl methacrylate, ethyl methacrylate, and mixtures thereof.

One particularly preferred nonhalogenated vinyl copolymer of the present invention (hereinafter referred to as the "Preferred Vinyl Copolymer") is a nonhalogenated vinyl copolymer of monomers comprising 5 to 40, preferably 15 to 40, parts by weight of (meth)acrylonitrile; 30 to 80 parts by weight of one or more nonhalogenated, nondispersing, vinyl monomers; 5 to 30 parts by weight of a nonhalogenated, hydroxyl functional, vinyl monomer; and 0.25 to 10, preferably 0.25 to 5, most preferably 0.5 to 2 parts by weight of a nonhalogenated, vinyl monomer bearing a dispersing group.

For the Preferred Vinyl Copolymer, the dispersing group is preferably selected from quaternary ammonium, carboxylic acid or salts thereof, phosphoric acid or salts thereof, phosphonic acid or salts thereof, sulfuric acid or salts thereof, sulfonic acid or salts thereof, and mixtures thereof. More preferably, the dispersing group is quaternary ammonium. When the dispersing group is quaternary ammonium, it is preferred that the vinyl monomer bearing a dispersing group is (meth)acryloyloxyethyl trimethylammonium chloride.

Preferably, the nonhalogenated, nondispersing, vinyl monomer of the Preferred Vinyl Copolymer is selected from styrene; an alkyl ester of (meth)acrylic acid wherein the alkyl group of the alkyl ester has 1 to 20 carbon atoms; and a blend comprising styrene and such an alkyl ester wherein the weight ratio of styrene to the alkyl ester is in the range from 10:90 to 90:10. For Preferred Vinyl Copolymers containing such an alkyl ester, the alkyl ester is preferably methyl (meth)acrylate, more preferably methyl methacrylate.

Nonhalogenated vinyl copolymers of the present invention can be prepared by free-radical polymerization methods known in the art, including but not limited to bulk, solution, emulsion and suspension polymerization methods. For example, according to the solution polymerization method, copolymers of the present invention are prepared by dissolving the desired monomers in an appropriate solvent, adding a chain-transfer agent, a free-radical polymerization initiator, and other additives known in the art, sealing the solution in an inert atmosphere such as nitrogen or argon, and then agitating the mixture at a temperature sufficient to activate the initiator.

Solvents useful in such polymerizations can vary according to solubility of the monomers and additives. Typical solvents include ketones such as acetone, methyl ethyl ketone, 3-pentanone, methyl isobutyl ketone, diisobutyl ketone, and cyclohexanone; alcohols such as methanol, ethanol, propanol, n-butanol, isopropanol, isobutanol, cyclohexanol and methyl cyclohexanol; esters such as ethyl acetate, butyl acetate, isobutyl acetate, isopropyl acetate, and the like; aromatic hydrocarbons such as benzene, toluene, xylenes, cresol, and the like; ethers such as diisopropyl ether, diisobutyl ether, tetrahydrofuran, tetrahydropyran, and dioxane; and aprotic solvents such as dimethylformamide, dimethylsulfoxide and the like, and mixtures thereof. The preferred solvent for preparation of the vinyl copolymers of the present invention is methyl ethyl ketone (MEK) because it is also the preferred medium in which the magnetic dispersions, described below, are prepared due to the ready solubility therein of phosphonated polyurethane-vinyl copolymer blends.

Chain transfer agents suitable for solution polymerization include but are not limited to alcohols, mercaptans, certain halogenated small molecules, and mixtures thereof. Preferably, the chain transfer agent is chosen from the group consisting of carbon tetrabromide, isooctylthioglycolate, mercaptosuccinic acid, mercaptopropane diol, dodecyl mercaptan, ethanol and carbon tetrachloride. Most preferably, the chain transfer agent is mercaptopropane diol.

Free-radical polymerization initiators suitable for solution polymerization include those that are soluble in the reaction solvent and that are thermally activated, including but not limited to azo compounds, peroxides, and mixtures thereof. Useful peroxide initiators include those chosen from the group consisting of benzoyl peroxide, lauroyl peroxide, di-t-butyl peroxide and the like, and mixtures thereof. Useful azo compound initiators include those chosen from the group consisting of 2,2'-azobis(2-methylbutyronitrile); 2,2'azobis(isobutyronitrile); and 2,2'-azobis(2,4-dimethylpentanenitrile); each of which is commercially available as VAZO 67, VAZO 64, and VAZO 52, respectively, from E. I. Du Pont de Nemours and Co. The preferred thermal polymerization initiator is the VAZO 64 brand initiator because of its ease of use and its half-life characteristics (e.g., at 64° C., half-life is 10 hours).

Nonhalogenated vinyl copolymers of the present invention can also be prepared by emulsion polymerization methods. Typically, an emulsion comprising vinyl monomers, a chain-transfer agent and a water-soluble redox-type initiator system is prepared in an inert atmosphere, then heated carefully until a reaction exotherm occurs. The reaction mixture is stirred and cooled and the resulting latex is collected. Optionally, an ionic or nonionic surfactant can be added to the reaction mixture. Oxidation—reduction ("Redox") free-radical initiators useful in the invention include but are not limited to those chosen from the group consisting of tertiary amines with organic peroxides (exemplified by the N, N-diethylaniline—benzoyl peroxide pair); organic halides with transition metal complexes (exemplified by the carbon tetrachloride—molybdenum hexacarbonyl pair); inorganic oxidation—reduction systems (exemplified by the potassium persulfate—sodium metabisulfite pair); and organic— inorganic systems (exemplified by the 2-mercaptoethanol—$Fe^{+3}$ pair). Inorganic redox initiators are preferred for the copolymers of the invention because of their ease of handling and useful reaction temperature range.

In addition to a hard resin component as described herein, the polymeric binder of the present invention also includes a soft resin polymer component in the form of a polyurethane polymer comprising at least one pendant dispersing group comprising a phosphonate diester group.

In a preferred embodiment, the soft resin component comprises a phosphonated polyurethane having a plurality of units of the formula:

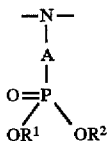

in which:

the nitrogen atom forms part of the backbone chain of the polymer,

A represents a single bond or divalent linking group, and R¹ and R² independently represent an alkyl group, cycloalkyl group, an aryl group or together comprise the necessary carbon atoms to complete a ring. Preferably A is a non-interfering linking group comprising up to 4, preferably up to 3, and most preferably up to 2 linear carbon atoms. "Non-interfering", when used in this respect, refers to a linking group that does not unduly limit the usefulness of the phosphonate diester group for its intended function as a dispersing group. In a particularly preferred embodiment, A is a single methylene group. The length of the linking group is relevant because it is believed that the ability of the phosphonate group to serve as a wetting group is dependent, at least in part, on its ability to form a chelating system in combination with the corresponding nitrogen atom of the backbone chain.

Preferably, the phosphonated polyurethane polymer is formed by reaction of the following components:

(a) a soft segment diol in which the hydroxy groups are separated by a flexible chain, (b) a hard segment diol in which the hydroxy groups are separated by a relatively inflexible chain, (c) a triol, (d) a diisocyanate, and (e) a dialkyl phosphonate of the formula:

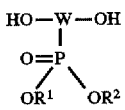

in which W is a trivalent linking group, R¹ and R² are as defined above and R³ and R⁴ independently represent divalent linking groups. Preferably, R¹ and R² are independently alkyl groups containing 1 to 5 carbon atoms or simple aryl groups containing 6 to 10 carbon atoms. More preferably, R¹ and R² are C₂H₅. In a preferred embodiment W is:

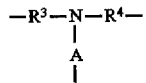

in which R³ and R⁴ independently comprise a carbon chain of up to 6 carbon atoms, preferably, —CH₂—CH₂—, and A is as defined above.

A preferred dialkyl phosphonate is diethyl bis-(2-hydroxyethyl) aminomethylphosphonate, available from AKZO under the trade name Fyrol-6.

The soft segment diol is a diol in which the hydroxy groups are separated by a flexible chain. In a preferred embodiment, the soft segment is a diol having a molecular weight of more than 300, preferably 300 to 3000, and more preferably 500 to 2500, and most preferably 1000 to 2000. Examples include Tone 210 (a polycaprolactone diol available from Union Carbide), Desmophen 2020E (a polycarbonate diol available from Bayer A.G and Ravecarb 106 (a polycarbonate diol available from Enichem America, Inc. The hard segment diol is a diol in which the hydroxy groups are separated by a relatively inflexible chain. Preferred hard segment diols have a molecular weight of less than about 300, a typical example being 2,2-dimethylpropane-1,3-diol, also known as neopentyl glycol (NPG).

A preferred triol is Tone 305 (a polycaprolactone triol available from Union Carbide). Typical diisocyanates include toluene diisocyanate, 4,4-diphenylmethane diisocyanate (MDI) and isophorone diisocyanate (IPDI). The phosphonated polyurethane generally has a phosphorus equivalent in the range 1,000 to 20,000, preferably 2,000 to 10,000. Because of the triol, the polyurethane is hydroxy functional and generally has a hydroxy equivalent of from 500 to 10,000.

Preferably, the weight ratio of the nonhalogenated vinyl copolymer to the soft resin polymer component is in the range from about 1:19 to 19:1, preferably 1:5 to 5:1, and more preferably 4:6 to 6:4.

A dispersion used to form a magnetic layer or backside coating can be compounded and coated by conventional methods known in the art to be suitable for compounding and coating such dispersions. For example, the ingredients of the magnetic layer or backside coating can be combined and mixed with a suitable solvent to form a substantially homogeneous dispersion. Generally, the crosslinker and catalyst, when used, are blended into the dispersion just prior to coating onto the substrate.

Next, the dispersion can be coated onto the nonmagnetic substrate, which can be primed or unprimed. The dispersion can be applied to the substrate by any conventional coating method, such as, gravure coating techniques, hydropneumatic coating techniques, and the like. The dispersion can be coated at various thicknesses, with useful dry caliper values being in the range from about 0.5 to 1.5 microns, and caliper values in the range from about 1 to 1.25 microns being preferred.

The coated substrate can then be passed through a drier, calendered if desired, and allowed to cure. If radiation curable materials are used in the backside coating, the coating can also be exposed to a suitable source of radiation, e.g., electron beam radiation. In the case of a magnetic layer, the coated substrate can be passed through a magnetic field prior to calendering in order to randomize or orient the magnetic pigment as desired.

Curing can be accomplished in a variety of ways. As one approach, an isocyanate crosslinking agent can be added to the dispersion just before the dispersion is coated onto the substrate. As soon as the isocyanate crosslinking agent is added to the dispersion, the NCO groups of the isocyanate crosslinking agent will begin to react with the hydroxyl groups of the polymeric binder. In certain situations, for instance, with magnetic tape recording media, a catalyst such as dibutyltin dilaurate can also be added in suitable catalytic amounts in order to facilitate this crosslinking reaction. Generally, using from 0.02 to 0.2 parts by weight of catalyst per 100 parts by weight of magnetic pigment is preferred.

The isocyanate crosslinking agent, if any, is a polyfunctional isocyanate having an average functionality of at least 2 isocyanate groups per molecule. Examples of specific polyfunctional isocyanate useful as the isocyanate crosslinking agent in the practice of the present invention include materials commercially available as MONDUR CB-601, CB-75, CB-701, MONDUR-MRS from Miles, Inc.; DESMODUR L available Bayer A.G.; CORONATE L from Nippon Polyurethane Ind., Ltd.; and PAPI from Union Carbide Corp.

The isocyanate crosslinking agent is preferably used in an amount such that the molar ratio of NCO groups from the isocyanate crosslinking agent to the total number of hydroxy groups from the hydroxy functional polymer is greater than 0. Preferably, the molar ratio of the NCO groups from the isocyanate crosslinking agent to the total number of hydroxy groups from the hydroxy functional polymer is in the range from about 0.3 to 5, and preferably from about 0.5 to 1.5.

As another approach, when one or more components of the polymeric binder contain radiation curable moieties, the dried coating can be irradiated to achieve curing of the radiation curable materials. Those skilled in the art, given the present teaching, will appreciate the manner in which irradiation can be achieved using any type of ionizing radiation that is capable of penetrating the pigment, e.g., electron beam ("E-beam") radiation. Preferably, radiation curing is achieved with an amount of electron beam radiation in the range from 1 to 20 Mrads, preferably 4 to 12 Mrads, and more preferably 5 to 9 Mrads of electron beam radiation having an energy in the range from 100 to 400 kev, preferably 200 to 250 keV.

Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising nitrogen or a noble gas and having an oxygen content of less than 500 parts per million ("ppm"). A preferred inert atmosphere is a nitrogen atmosphere having an oxygen content of less than 75 parts per million.

The use of radiation curing techniques may offer some advantages over isocyanate curing techniques. Whereas isocyanate curing of magnetic media is chemically unselective and highly dependent on such variables as temperature and humidity, radiation curing techniques are less sensitive to temperature and humidity. Moreover, radiation curing techniques allow one to control, to a certain extent, which polymers become crosslinked and which polymers do not become crosslinked. For instance, for a polymeric binder containing a polyurethane polymer and a nonhalogenated vinyl copolymer wherein only the polyurethane has a pendant radiation curable moiety, the 'soft' polyurethane can be cured by electron beam induced crosslinking of the radiation curable moiety on the polyurethane polymer.

The 'hard' vinyl copolymer, having no radiation curable moieties, is not formally cured. Experiments have shown, however, that the vinyl copolymer may nevertheless undergo some crosslinking upon exposure to E-beam irradiation. It is known, for instance, that styrene-acrylonitrile copolymers undergo crosslinking during E-beam exposure.

Traditionally, radiation curable formulations have most commonly relied upon the reactivity of acrylates, methacrylates, and the like to achieve radiation-induced crosslinking. Unfortunately, however, magnetic dispersions prepared from such materials tend to undergo unwanted crosslinking reactions under ambient conditions to form gels, particularly when the magnetic pigment is a metal particle pigment. These dispersions are especially prone to suffer from undesirable crosslinking during dispersion milling.

However, because radiation curable polymers having dispersing groups are capable of wetting the pigment, it is desirable to include at least some of such polymers in the milling step. In order to accomplish this, radiation curable (meth)acrylate groups can be replaced (in the manner provided in co-pending U.S. Ser. No. 08/054,312) by allyloxy groups (—O—CH$_2$—CH=CH$_2$), or α-methyl styrene moieties of the formula:

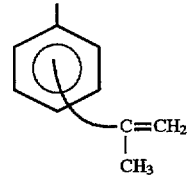

The present invention will now be further described by the following illustrative examples.

EXAMPLE 1

Preparation of Nonhalogenated Vinyl Copolymer A

Sample (Sample A) of nonhalogenated vinyl copolymer useful in preparing a binder composition of the present invention was prepared from the following ingredients:

| Ingredients (in parts by weight) | Sample A |
| --- | --- |
| S (Styrene) | 161.25 |
| AN (Acrylonitrile) | 50.0 |
| HPA (hydroxypropylacrylate) | 37.5 |
| MOTAC (methacryloyloxyethyl trimethyl ammonium chloride) | 1.25 |
| MPD (mercaptopropane diol) | 0.5 |
| MEK (methyl ethyl ketone) | 375 |
| AIBN (2,2'-azobisisobutyronitrile) | 1.25 |

The ingredients were charged into a 32 ounce (944 ml) amber reaction bottle. The resultant admixture, which contained some undissolved methacryloyloxyethyl trimethyl ammonium chloride, was purged with N$_2$ for 7 minutes at a flow rate of 1 liter per minute, after which the bottle was sealed. The sealed bottle and its contents were tumbled for 80 hours in a constant temperature bath maintained at a temperature between 65° C. and 70° C. The resulting product was a clear, homogeneous solution containing a nonhalogenated vinyl copolymer of the present invention.

The inherent viscosity of Sample A in MEK was determined to be 0.32 deciliters/gram, according to the procedure described in F. Rodriguez, "Principles of Polymer Systems," Chemical Engineering Series, 2nd Edition (McGraw-Hill), pages 181–185. The glass transition temperature (Tg) was determined to be 95° C. by differential scanning calorimetry as described, for instance, in Allcock and Lampe, *Contemporary Polymer Chemistry*, pp. 436–437 (1981); Wunderlich and Gaur, "Differential Scanning Calorimetry of Flexible, Linear Macromolecules", *Polymer Characterization: Spectroscopic, Chromatographic and Physical Instrument Methods*, pp. 195–199 (1983).

EXAMPLE 2

Synthesis of Polyurethane Sample B

A polycarbonate diol available from Bayer A.G. under the tradename Desmophen 2020E (234.78 g, 0.235 moles OH) was dissolved in 1000 mL MEK. To the solution were added neopentyl glycol (NPG) (72.00 g, 1.385 moles OH); a diethyl bis-(2-hydroxyethyl)aminomethylphosphonate available from Akzo Chemicals, Inc. under the tradename Fyrol-6 (40.80 g, 0.320 moles OH); and an additional 200 mL MEK. Under a steady flow of nitrogen the stirred solution was heated to reflux, and 400 mL of distillate was collected in order to remove water from the solution. The solution was allowed to cool to around 40° C. and approximately 0.5 mL dibutyltin dilaurate ("DBTDL") catalyst was added.

A solution of diphenylmethane-4,4'-diisocyanate (MDI) (292.42 g, 2.339 moles NCO) in MEK (300mL) was prepared and added to the solution of diols, followed by more MEK (200 mL). The mixture was heated to reflux under nitrogen for two hours. A solution of a polycaprolactone triol available from Union Carbide Corporation under the tradename Tone 0305 (160 g, 0.879 moles OH) was prepared in MEK (200 mL) and added. Refluxing continued for an additional one-half hour, until no residual isocyanate could be detected.

The final polymer had a calculated phosphorus equivalent weight of 5,000.

Synthesis of Polyurethane Sample C

The same procedure was used as in the synthesis of Polyurethane B except that the Desmophen 2020E-brand polycarbonate diol was replaced by a similar polycarbonate diol available under the tradename Ravecarb 106 from Enichem America, Inc.

EXAMPLE 3

Preparation of Magnetic Layer Dispersions

The following dispersion combinations were prepared in order to compare a binder system of the present invention with a binder system employing a conventional vinyl chloride copolymer.

| Sample 1 | Copolymer A (Example 1) + Polyurethane B (Example 2) |
| --- | --- |
| Comparison 1 | Quaternary ammonium functional vinyl chloride copolymer + Polyurethane B (Ex. 2) |

Dispersions were formulated having the ingredients described in Table 1. Each composition was prepared in a ratio of 70/30, by weight, of the hard resin/soft resin. Table 1 shows the formulation based on the activated dry coating. All dispersions were prepared using a Shar™ mixer for the pre-mix step and a horizontal mill for milling. Ceramic milling media was used, having an average diameter of 1 mm. The solvent system was 60% MEK, 30% cyclohexanone and 10% toluene for all the dispersions. The solids component of each dispersion is set forth in Table 2. Only the solvents, binders, and magnetic pigment were put into the premix, which was then milled until smooth. The carbon was then added and the mixture again milled until smooth. The predispersed aluminum oxide (in toluene, dispersed with oleic acid) and the lubricants were then added.

TABLE 1

| Ingredients (in parts by weight) | Sample 1 | Comp. 1 |
| --- | --- | --- |
| Barium Ferrite (0.06 micron particle size) | 77 | 77 |
| Aluminum Oxide (0.3 micron particle size) | 5 | 5 |

TABLE 1-continued

| Ingredients (in parts by weight) | Sample 1 | Comp. 1 |
| --- | --- | --- |
| Carbon Black, Ketjen (15–30 nm particle size) | 2.7 | 2.7 |
| Isocetyl Stearate | 3.0 | 3.0 |
| Oleic Acid | 1.7 | 1.7 |
| Copolymer A | 5.3 | 0 |
| Polyurethane B | 2.3 | 2.3 |
| Halogenated Copolymer | 0 | 5.3 |
| Isocyanate | 3.0 | 4.2 |

Both of the above dispersions were applied to a polyethylene terephthalate film at a thickness of 75 microns. Just prior to coating, the isocyanate was blended into the dispersion. The samples were then coated, and the coating was randomized, dried and cured using conventional techniques. Diskette media were then punched from the resultant product and assembled into diskettes using 2MB plastic clamshells.

Table 2 provides a comparison of the dispersions and related properties of the resulting coatings from Table 1. Surface smoothness was measured on a Wyko optical interferometer. The results reported are in nm root mean square average and are reported for both sides of the diskette. Hardness was measured by a nanoindentation technique using 0.5 mNewtons force with a spherical indenter from UMIS. Torque was measured on a Sony 2MB drive; the diskette was running on a single track and the torque with the heads loaded was monitored up to two hours. Durability was checked while diskettes were running on 4MB drives in an environmental chamber that cycled between hot/humid and cold/dry. The heads were cycling on track 0. The visual appearance of the diskette was monitored.

TABLE 2

| Properties | Sample 1 | Comp. 1 |
| --- | --- | --- |
| % solids | 42.2 | 40.9 |
| ICI viscosity, cps | 21 | 23 |
| # mill passes to smoothness | 17 | 15 |
| Surface smoothness of Diskette, (nm) RMS, Side 1/Side 0 | 11.12/9.82 | 12.41/12.09 |
| Tg, °C. | 60 | 53 |
| Hardness, mPascal | 85 | 86 |
| Torque @ 1 min., g-cm | 45.5 | 56.4 |
| Torque @ 2 hrs., g-cm | 49.5 | 58.5 |
| Durability (# passes × $10^6$) | >10 | >10 |
| Modulus, gPascal | 2.84 | 2.69 |

The data displayed in Table 2 demonstrates that the dispersion of the present invention, i.e., Polyurethane B in combination with Copolymer A, produced significantly improved quality coatings, particularly as shown by the low values of surface smoothness. In addition to improved surface smoothness, this binder blend appeared to afford several advantages to the resultant media. For example, magnetic layers containing this binder blend exhibited improved Tg and smoothness, and were at least equivalent to the comparative sample in all other respects. Such improvement is highly desirable and should provide improved durability of the product under rigorous conditions.

EXAMPLE 4

Effect of Varying Ratio Blends

Table 4 describes formulations (Samples 1 through 3) that were prepared containing various ratios of hard resin (nonhalogenated vinyl Copolymer A) and soft (Polyurethane B) binder combinations. The ratios used were 70/30, 50/50, and 30/70 of Copolymer A and Polyurethane B, respectively, for samples 1 through 3. Polyurethane B was prepared as described in Example 2 and nonhalogenated vinyl Copolymer A was prepared as described in Example 1.

Table 4 also describes a comparison sample, prepared using a quaternary ammonium functional vinyl chloride copolymer and a polyurethane having carboxyl, as opposed to phosphonate ester, wetting groups. Table 4 shows the weight of each ingredient based on the activated dry coating. The dispersions were prepared and used to make diskettes using the methods described in Example 3.

TABLE 4

| Ingredients (in parts by weight) | Comp. 1 | Sample 1 (70A/30B) | (Sample 2 (50/50) | Sample 3 (25/75) |
|---|---|---|---|---|
| Barium Ferrite | 77 | 77 | 77 | 77 |
| Aluminum Oxide | 5 | 5 | 5 | 5 |
| Carbon Black, Ketjen | 2.7 | 2.7 | 2.7 | 2.7 |
| Isocetyl Stearate | 3.0 | 3.0 | 3.0 | 3.0 |
| Oleic Acid | 1.7 | 1.7 | 1.7 | 1.7 |
| Copolymer A | 0 | 5.3 | 3.8 | 2 |
| Polyurethane B | 0 | 2.3 | 3.8 | 6 |
| Halogenated Copolymer | 5.3 | 0 | 0 | 0 |
| Polyurethane (carboxyl) | 2.3 | 0 | 0 | 0 |
| Isocyanate | 3.0 | 3.0 | 3.0 | 2.6 |

Table 5 shows the properties of the various ratio blends of the nonhalogenated copolymer (Copolymer A) and phosphonated polyurethane (Polyurethane B) and the comparison diskette formulation described in Table 4. The solids were coated at 35% solids in MEK/cyclohexanone/toluene (60/30/10).

TABLE 5

| Description | Comp. 1 | Sample 1 | Sample 2 | Sample 3 |
|---|---|---|---|---|
| % solids | 38.3 | 42.2 | 43.9 | 44.1 |
| ICI viscosity, cps | 22 | 21 | 23 | 23 |
| # mill passes to smoothness | 15 | 17 | 18 | 15 |
| Surface smoothness of Diskette, nm RMS, Side 1/Side 0 | 11.4/11.3 | 11.1/19.8 | 9.3/9.2 | 8.7/8.3 |
| Tg, °C. | 41 | 60 | 65 | 50 |
| Hardness, mPascal | 84 | 85 | 93 | 86 |
| Torque @ 1 min., g-cm | 45/1 | 45/5 | 39 | 39.4 |
| Torque @ 2 hrs., g-cm | 46.7 | 49.5 | 40 | 41.4 |
| Durability (# passes × $10^6$) | >10 | >10 | >10 | >10 |
| Modulus, gPascal | 2.67 | 2.84 | 2.91 | 2.96 |

As compared to the comparison diskette sample, the diskettes prepared using each of the exemplified blends of the composition of the present invention demonstrated properties that were comparable to or better than those of the comparison diskette. The present blends generally demonstrated improved Tg and hardness, without the presence of an undesirable halogenated hard resin. A harder coating with a high Tg is highly desirable to produce magnetic media with potentially lower friction, reduced level of adherent debris, and greater durability.

EXAMPLE 5

Backside Coating Formulation

A composition of the present invention was used as the backside formulation for a magnetic recording tape incorporating metal particle magnetic pigment. The composition was used to prepare a dispersion of a non-magnetic pigment for use as a backside coating.

A formulation was prepared having the ingredients outlined in Table 6. Copolymer A was prepared according to Example 1 and Polyurethane C was prepared according to Example 2. The backside dispersion was prepared by mixing the two polymers in MEK and toluene solvents so that a 70/30 solvent ratio is obtained.

Dispersions containing both binder components (1:1 weight ratio) and carbon black pigment were prepared and examined over a period of four weeks. During this period, as can be seen in Table 7, the dispersions remained stable, yielded high values (>90) of Gloss (45°), as well as high Tg and high dynamic mechanical analysis modulus.

The conductive particle, carbon black pigment, was provided having a particle size of 29 nm, a surface area of 254 $m^2/gm$ and a pH of 5.0. The wear particle used was alumina having an approximate particle size of 0.4 microns, a surface area of 9 $m^2/gm$ and a pH of 8.0. The carbon and alumina powders were combined and this premix was stirred for three hours using a Shar™ mixer. The premix was then sandmilled in a horizontal mill with 1 mm ceramic media. Smooth dispersion usually required at least ten mill passes with a shaft speed of 900 rpm at a flow rate of 0.25 gallons per minute. A second solvent charge was added and the finished dispersion was then filtered through 0.5 micron filters before coating.

The dispersion was activated with isocyanate ("CB701™", available from Miles Inc.) and an isocyanate crosslinking agent, and was then gravure coated and calendered for a final dry coating caliper of about 35 micro inches.

TABLE 6

| RAW MATERIAL | AMOUNT | SOLIDS | SOLVENT | WT % SOLID (per material) |
|---|---|---|---|---|
| MEK | 3925 | — | 3925 | — |
| TOLUENE | 2633 | — | 2633 | — |
| COPOLYMER A (44.0% IN MEK) | 1818 | 800 | 1018 | 22.0 |
| POLYURETHANE C (40.0% IN MEK) | 2000 | 800 | 1200 | 22.1 |
| CARBON | 1376 | 1376 | — | 38 |
| ALUMINUM OXIDE | 270 | 270 | — | 7.5 |
| 27.0% SOLIDS AT MILLING | | | | |
| TOTAL WEIGHT IN MILL | 12,022 | 3,246 | 8776 | — |
| THIN TO 18% WITH 70/30 MEK/TOLUENE | 6011 | — | 6011 | — |

TABLE 6-continued

| RAW MATERIAL | AMOUNT | SOLIDS | SOLVENT | WT % SOLID (per material) |
|---|---|---|---|---|
| ACTIVATOR | 537 | 376 | — | 10.3 |
| TOTAL | 18,570 | 3622 | 14787 | 100 |

It can be seen from Table 7 that the composition of the present invention provided a backside coating having low viscosity, high modulus and a high upper Tg. Additionally, the dispersion exhibited stability for greater than 3 weeks. The formulation exhibited little or no debris during short length back and forth cycling. This was generally interpreted as a backside coating running clean and an indication of wear performance.

This Example demonstrates the versatility of binder combinations of the present invention, by providing good quality dispersions of non-magnetic pigments as well as the ability to provide durable coatings.

TABLE 7

| RESIN BINDER COMBI-NATION | ICI Visc cps | Wyko RMS nm | Free Film Coating Modulus in GigaPascal | | | Tg onset, °C. | Gloss @ 60° |
|---|---|---|---|---|---|---|---|
| | | | 20° C. | 50° C. | 80° C. | | |
| Sample | 5 | 26 | 2.8 | 1.8 | 0.3 | −40, 45 | 96 |

EXAMPLE 6

Radiation Curable Compositions

A radiation curable nonhalogenated vinyl copolymer was used in combination with a phosphonated polyurethane to prepare a composition of the present invention. Polyurethane C prepared as described in Example 2 was functionalized in the following manner in order to render it radiation curable.

To 2240 gms of 40% Polyurethane C in MEK was added 69.5 grams of isocyanatoethylmethacrylate (IBM) and about 13 drops of DBTDL catalyst. The reaction vessel was heated at 55° C. overnight. The next day, IR spectroscopy indicated that the reaction was complete since the isocyanate peak had completely disappeared from the IR spectrum, indicating the preparation of functionalized product, referred to herein as "Polyurethane C-IEM".

A solution of Copolymer A (prepared as described in Example 1), 1838 gms of 45.7% in MEK and 1990 gms of 42.2% Polyurethane C-IBM in MEK was added to 2232 gms of toluene and 2988 gms of MEK. The resulting solution was mixed for 5 minutes. Carbon black (1170 g) was then added to the solution. The dispersion container was fitted with a water cooling jacket, and the dispersion was mixed in a Shar™ mixer at 4000 rpm for an additional 3 hours.

The mixed dispersion was then milled in a sandmill using ceramic media until the dispersion was smooth, after which MEK (2773 gms) and toluene (1188 gms) were added to the dispersion. The dispersion was milled one more final pass. Prior to coating, 353 gms of an alumina dispersion (65.1%) in MEK was added to the main dispersion. This main dispersion was then thinned to 18% solids with a 70/30 solution (wt/wt) of MEK/toluene.

The thinned main dispersion was gravure coated onto one side of a thin gauge polyester (PET) substrate. The coated substrate was then dried at 140° F. A metal particle dispersion was then coated onto the other side of the PET substrate. The coated substrate was then sequentially dried in two ovens at 140° F. and 180° F., and the magnetic and the backside coatings were then calendered. The coatings were then cured with 8 megarads of electron beam radiation in a $N_2$ atmosphere containing no more than 50 ppm $O_2$.

The resultant coating was compared with a coating prepared using an isocyanate cure (as in Example 5). Table 8 provides a comparison of tape cupping (½" slit width) of the media. The magnetic layers on the opposite side of each substrate were the same. A negative cupping measurement indicates that the cupping was towards the backside coating while a positive number indicates that cupping was towards the magnetic layer. The tapes were storm under ambient conditions.

TABLE 8

| Backside Binder Combination | cupping after 9 days in microns | cupping after 13 days in microns | cupping after 56 days in microns | magnetic layer caliper in microns | backside coatingcaliper in microns |
|---|---|---|---|---|---|
| E-beam cured | −120 | 0 | +247 | 2.4 | 0.64 |
| Isocyanate cured | −410 | −475 | −418 | 2.4 | 0.91 |

In magnetic tapes having coatings on both sides of the substrate, it is a general rule that the coated surface that exhibits greater stress will cause the tape to 'cup' towards that coating. However, double-sided coated substrates will exhibit stresses on each side. In theory, if the stresses are substantially equal they will tend to cancel each other out and ideally a flat tape will result. In fact, however, the stresses do not even themselves out, and the direction of cupping is useful as an indication of which coating has excess stress. Accordingly, the stresses on both surfaces should ideally be kept as low as possible.

The direction and magnitude of the cupping in Table 8 show that at 56 days the magnetic tape with the E-beam cured backside coating was cupping towards the magnetic layer. The isocyanate cured coating showed the opposite direction, but more importantly, also demonstrated a magnitude of cupping that was about twice as great.

EXAMPLE 7

Radiation Curable Diskette Media

A radiation curable composition of the present invention was prepared in a form suitable for diskette application. Polyurethane C (described in Example 2) was functionalized with a,a-dimethyl meta-isopropenyl benzyl isocyanate (TMI) in the following manner.

To 700 gms of 40% Polyurethane C in MEK (0.14 moles OH) was added 28.2 gms (0.14 moles of TMI about 11 drops of DBTDL catalyst. The reaction vessel was sealed and heated at 55° C. When the IR spectrum peak of isocyanate completely disappeared the reaction was stopped, indicating the complete formation of Polyurethane C-TMI.

In a five gallon pail the following were combined: 6856 gms of MEK, 806 gms toluene, 709.9 gms Copolymer A (44.5%, prepared as described in Example 1), 5.4 gms propyl gallate, 5.4 g of a process stabilizer ("Irgafos 168", available from Ciby-Geigy, Co.), 4467 gms of a cobalt doped gamma iron oxide, and 581 gms alumina (0.4 micron). The mixture was premixed using a Shar mixer with a water cooling jacket for 2 hours. The resulting dispersion was passed in Igarashi mills with ceramic media until the dispersion was smooth in order to form an oxide dispersion.

A 'small particle' carbon dispersion was prepared by pre-mixing 1341 gms MEK, 207 gms toluene, 436.8 gms of Copolymer A (44.5%) in MEK, 471.8 gms of 41.2% "Polyurethane C-TMI" in MEK and 268 gms of a conventional form of carbon black pigment having a particle size range of 15–30 nm and milling in Igrashi mills with ceramic media until smooth.

A 'large particle' carbon dispersion was prepared in a 2 liter sandmill. A small portion of this dispersion containing 53.9 gms of Copolymer A (44.5%) in MEK, 60 gms of 40% Polyurethane C in MEK and 89 gms of a conventional form of carbon black pigment having a particle size range of 300–500 nm was premixed with a shar mixture for 5 hours at 60% solids with a 67/20/13 ratio of MEK/toluene/cyclohexanone solvents. The pre-mix was milled 12 passed in the sandmill. MEK solvent was added during the milling process to reduce the solids content to 51.5%.

The oxide dispersion, the 'small carbon' dispersion and the 'large carbon' dispersion were mixed together along with the following: 4658 gms of MEK, 576 gms of xylene, 45 gms of oleic acid, 268 gms isocetyl stearate, 537 gms of 41.6% Polyurethane C-IEM (prepared as described in Example 8), and 292 gms of Copolymer A (44.5%) in MEK. The resulting main dispersion was then mixed under high shear and filtered.

The main dispersion was coated onto one side of 3 rail polyethylene terephthalate ("PET") substrate and the coating was sent through a 4 inch AC randomizer with 160 gauss field strength. The coated substrate was then dried at 140° F. The opposite surface was coated then coated using the same main dispersion and dried in the same manner. Both coatings were calendered and cured with 9 megarads of electron beam radiation.

The resulting diskette media exhibited coercivity value of 755 Oe, and a resistance value of 2.5 E7 ohms. The magnetic layer had a 45° gloss value of 92, a 60° gloss value of 137 and a Rodenstock surface smoothness value of 6.9. These values are comparable to or better than those presently exhibited by commercial diskette media. The diskette media displayed excellent durability and electrical amplitude.

What is claimed is:

1. A polymeric binder system useful for a magnetic recording medium, the polymeric binder system comprising (a) a hard resin component comprising a nonhalogenated vinyl copolymer consisting essentially of a carbon backbone, a plurality of pendant nitrile groups, a plurality of pendant-hydroxyl groups, at least one pendant dispersing group, and, optionally, nonhalogenated, nondispersing pendant groups selected from the group consisting of alkyls, aryls, and carboxyl esters, and b) a soft resin component comprising a polyurethane polymer comprising a plurality of units of the formula:

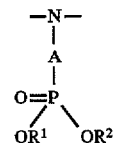

in which the nitrogen atom forms part of the backbone chain of the polymer,

A represents a single bond or divalent linking group, and $R^1$ and $R^2$ independently represent an alkyl group, cycloalkyl group, an aryl group or together comprise the necessary carbon atoms to complete a ring.

2. A polymeric binder system according to claim 1 wherein:

(a) the hard resin component comprises a nonhalogenated vinyl copolymer wherein the vinyl copolymer is a copolymer of monomers consisting essentially of:
  (i) 5 to 40 parts by weight of (meth)acrylonitrile;
  (ii) 30 to 80 parts by weight of a nonhalogenated, nondispersing, vinyl monomer;
  (iii) 5 to 30 parts by weight of a nonhalogenated, hydroxyl functional, vinyl monomer; and
  (iv) 0.25 to 10 parts by weight of a nonhalogenated, vinyl monomer bearing a dispersing group, and (b) the soft resin component comprises a phosphonated polyurethane polymer having a plurality of units of the formula:

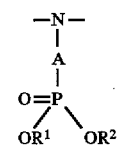

in which:

the nitrogen atom forms part of the backbone chain of the polymer,

A represents a single bond or divalent linking group, and $R^1$ and $R^2$ independently represent an alkyl group, cycloalkyl group, an aryl group or together comprise the necessary carbon atoms to complete a ring.

3. A polymeric binder system according to claim 2 wherein A is a linking group comprising up to 4 linear carbon atoms.

4. A polymeric binder system according to claim 3 wherein A is a single methylene group.

5. A polymeric binder system according to claim 2 wherein the nonhalogenated, nondispersing, vinyl monomer is selected from the group consisting of (meth)acrylonitrile, β-cyanoethyl-(meth)acrylate, 2-cyanoethoxyethyl (meth)acrylate, p-cyanostyrene, p-(cyanomethyl)styrene.

6. A polymeric binder system according to claim 2 wherein the nonhalogenated, hydroxyl functional, vinyl monomer is selected from the group consisting of 2-hydroxyethyl (meth)acrylate, 2-hydroxypropyl (meth)

acrylate, 1,3-dihydroxypropyl-2-(meth)acrylate, 2,3-dihydroxypropyl-1-(meth)acrylate, 2-hydroxyethyl vinyl ether; 4-vinylbenzyl alcohol; allyl alcohol, and p-methylol styrene.

7. A polymeric binder system according to claim 6 wherein the nonhalogenated, hydroxyl functional, monomer is selected from the group consisting of 2-hydroxyethyl (meth)acrylate, 2-hydroxypropyl (meth)acrylate, and mixtures thereof.

8. A polymeric binder system according to claim 1 wherein the phosphonated polyurethane polymer has a phosphorus equivalent weight in the range 1,000 to 20,000.

9. A polymeric binder system according to claim 8 wherein the phosphorus equivalent weight is in the range 2,000 to 10,000.

10. A polymeric binder system according to claim 1 wherein the phosphonated polyurethane polymer has a hydroxy equivalent weight in the range 500 to 10,000.

11. A polymeric binder system according to claim 1 wherein the vinyl copolymer has a hydroxyl equivalent weight in the range from about 300 to about 10,000.

12. A polymeric binder system according to claim 1 wherein the vinyl copolymer has a dispersing group equivalent weight in the range from about 2000 to about 100,000.

13. A polymeric binder system according to claim 1 wherein the weight ratio of the hard resin component to the soft resin component is in the range from about 1:19 to 19:1.

14. A polymeric binder system according to claim 13 wherein the weight ratio is in the range from about 1:5 to 5:1.

15. A polymeric binder system according to claim 1 wherein the phosphonated polyurethane polymer further comprises a radiation curable moiety capable of allowing the polymer to be crosslinked by exposure to electron beam radiation.

16. A polymeric binder system according to claim 2 wherein the phosphonated polyurethane polymer is formed by reaction of the following components:
(a) a soft segment diol in which the hydroxy groups are separated by a flexible chain,
(b) a hard segment diol in which the hydroxy groups are separated by a relatively inflexible chain,
(c) a triol,
(d) a diisocyanate, and
(e) a dialkyl phosphonate of the formula:

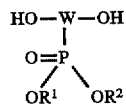

in which W is of the formula:

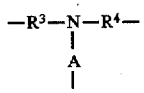

$R^1$ and $R^2$ independently represent an alkyl group, cycloalkyl group, an aryl group or together comprise the necessary carbon atoms to complete a ring, and $R^3$ and $R^4$ independently represent divalent linking groups and A represents a single bond or divalent linking group.

17. A polymeric binder system according to claim 16 wherein $R^1$ and $R^2$ are selected from the group consisting of alkyl groups containing 1 to 5 carbon atoms and aryl groups containing 6 to 10 carbon atoms.

18. A polymeric binder system according to claim 16 wherein $R^1$ and $R^2$ are both —$C_2H_5$— and $R^3$ and $R^4$ comprise a carbon chain of up to 6 carbon atoms.

19. A polymeric binder system according to claim 18 wherein $R^3$ and $R^4$ are both —$CH_2$—$CH_2$—.

20. A polymeric binder system according to claim 16 wherein the soft segment diol is a polycaprolactone diol or a polycarbonate diol; the hard segment diol is 2,2-dimethyl propane-1,3-diol; the triol is a polycaprolactone triol; and the diisocyanate is 4,4-diphenylmethanediisocyanate or isophorone diisocyanate.

21. A composition useful for preparing magnetic media, the composition comprising:
(a) a polymeric binder system comprising (i) a hard resin component comprising a nonhalogenated vinyl copolymer consisting essentially of a carbon backbone, a plurality of pendant nitrile groups, a plurality of pendant hydroxyl groups, at least one pendant dispersing group, and, optionally, nonhalogenated, nondispersing pendant groups selected from the group consisting of alkyls, aryls, and carboxyl esters, and (ii) a soft resin component comprising a polyurethane polymer comprising a plurality of units of the formula:

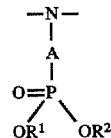

in which the nitrogen atom forms part of the backbone chain of the polymer,
A represents a single bond or divalent linking group, and $R^1$ and $R^2$ independently represent an alkyl group, cycloalkyl group, an aryl group or together comprise the necessary carbon atoms to complete a ring, and
(b) a pigment dispersed in the polymeric binder system.

22. A composition according to claim 21 wherein the pigment is a magnetic pigment.

23. A composition according to claim 21 wherein the pigment is a nonmagnetic pigment.

24. A composition according to claim 21 wherein:
(a) the hard resin component comprises a nonhalogenated vinyl copolymer wherein the vinyl copolymer is a copolymer of monomers consisting essentially of:
(i) 5 to 40 parts by weight of (meth)acrylonitrile;
(ii) 30 to 80 parts by weight of a nonhalogenated, nondispersing, vinyl monomer;
(iii) 5 to 30 parts by weight of a nonhalogenated, hydroxyl functional, vinyl monomer; and
(iv) 0.25 to 10 parts by weight of a nonhalogenated, vinyl monomer bearing a dispersing group, and
(b) the soft resin component comprises a phosphonated polyurethane polymer having a plurality of units of the formula:

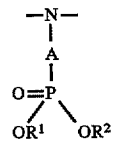

in which:

the nitrogen atom forms part of the backbone chain of the polymer,

A represents a single bond or non-interfering divalent linking group, and $R^1$ and $R^2$ independently represent an alkyl group, cycloalkyl group, an aryl group or together comprise the necessary carbon atoms to complete a ring.

* * * * *